(12) United States Patent
Kumano et al.

(10) Patent No.: US 8,224,555 B2
(45) Date of Patent: *Jul. 17, 2012

(54) CONTROL APPARATUS OF SPARK IGNITION INTERNAL COMBUSTION ENGINE

(75) Inventors: Kengo Kumano, Hitachinaka (JP); Yoshihiro Sukegawa, Hitachi (JP); Shiro Yamaoka, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 448 days.

This patent is subject to a terminal disclaimer.

(21) Appl. No.: 12/470,602

(22) Filed: May 22, 2009

(65) Prior Publication Data

US 2009/0299610 A1   Dec. 3, 2009

(30) Foreign Application Priority Data

May 30, 2008 (JP) ................. 2008-141820

(51) Int. Cl.
*B60T 7/12* (2006.01)
(52) U.S. Cl. ...... 701/104; 123/321; 123/347; 123/90.15
(58) Field of Classification Search .................. 701/101, 701/103–105; 123/321, 345–348, 90.1, 90.15
See application file for complete search history.

(56) References Cited

U.S. PATENT DOCUMENTS

| 7,055,495 | B2 * | 6/2006 | Yamaoka et al. ............. 123/305 |
| 2002/0046741 | A1 | 4/2002 | Kakuho et al. | |
| 2002/0195078 | A1 | 12/2002 | Hasegawa et al. | |
| 2009/0063021 | A1 * | 3/2009 | Natsui et al. .................. 701/105 |
| 2009/0070007 | A1 * | 3/2009 | Natsui et al. .................. 701/103 |

FOREIGN PATENT DOCUMENTS

| JP | 2000-073803 | | 3/2000 |
| JP | 2001-159329 | A | 6/2001 |
| JP | 2002-129991 | | 5/2002 |
| JP | 2003-003873 | | 1/2003 |
| JP | 2006-336494 | A | 12/2006 |

OTHER PUBLICATIONS

Japanese Office Action for JP 2008-191820 (Aug. 19, 2010) and English translation thereof.

* cited by examiner

*Primary Examiner* — John Kwon
(74) *Attorney, Agent, or Firm* — Crowell & Moring LLP

(57) ABSTRACT

In an in-cylinder injection type spark ignition internal combustion engine in which the intake air amount is controlled by use of an intake valve or an exhaust valve, which is provided with mainly a variable valve mechanism, instable combustion during a low-load operation is avoided without an increase in pumping loss (without a decrease in the thermal efficiency). In the in-cylinder injection type spark ignition internal combustion engine, during low-load operation, on the basis of the cooling water temperature of the engine the opening and closing timing of the intake valve is controlled in a retard angle manner and the opening and closing timing of the exhaust valve is controlled in an advance angle manner. Furthermore, the fuel injection timing is controlled in a retard angle manner on the basis of the retard angle amount of the intake valve opening and closing timing.

5 Claims, 15 Drawing Sheets

CONTROL APPARATUS OF SPARK IGNITION INTERNAL COMBUSTION ENGINE

BACKGROUND OF THE INVENTION

1. Field of the Invention

The present invention relates to a control apparatus of a spark ignition engine and, more particularly, to a control apparatus and a control method suitable for the combustion stabilization of a spark ignition engine that controls the intake air flow by an intake valve and an exhaust valve, which are provided with mainly a movable valve mechanism.

2. Background Art

As measures to improve the fuel consumption of a spark ignition internal combustion engine used in automobiles and the like, a reduction of pumping losses of the engine is effective. In recent years, attention has been given to engines that aim to reduce pump losses by providing a variable valve mechanism in an intake valve and by controlling the intake air flow not by use of a throttle provided in the intake valve, but mainly by the opening and closing timing of the intake valve (early closing of the intake valve).

In these engines, however, compared to usual operation performed through the use of a throttle, the compression end temperature decreases because the effective compression ratio decreases as a result of early closing of the intake valve, and hence combustion tends to become unstable particularly during low-load operation.

As measures to avoid unstable combustion during low-load operation, first, there are known engines in which the intake air flow is controlled by using a throttle instead of an intake valve only under extremely low load, such as idling, whereby the effective compression ratio is improved and unstable combustion is avoided (refer to JP Patent Publication (Kokai) No. 2001-159329 A, for example).

Second, there are known engines in which combustion stability is improved by improving the effective compression ratio by retarding the opening and closing timing of an intake valve in angle under the low-load conditions of idling and cooling fan operation and an increase in the intake air flow caused by this retarding in angle is suppressed by reducing the lift amount of the intake valve (refer to JP Patent Publication (Kokai) No. 2006-336494 A, for example).

SUMMARY OF THE INVENTION

In the case of the in-cylinder injection method, it is necessary to inject fuel in the period when the intake valve is open (particularly, in the vicinity of the period when the velocity of the air flowing into the combustion chamber becomes a maximum) in order to promote the mixing of the fuel with the air. Therefore, when the early closing of the intake valve is adopted, the fuel is injected earlier than usual and this means that the injection is performed when the distance between a piston and a fuel injection valve is short. Furthermore, at this time, depending on the characteristics of a variable valve mechanism, the lift amount of the intake valve decreases due to the early closing of the intake valve, with the result that the downward flow velocity of the air flowing from the intake valve to the combustion chamber side increases. Due to these factors, at the early closing of the intake valve, a condition in which the injected fuel easily reaches the piston crown face and a large amount of fuel adheres to the piston crown face. For this reason, variations occur in the mixture formation in each cycle, constituting one of the causes of unstable combustion.

The object of the present invention is to provide a control apparatus of a spark ignition internal combustion engine capable of avoiding unstable combustion under low load while obtaining the pumping loss reducing effect (the fuel consumption reducing effect) by the intake air flow control using an intake valve and an exhaust valve.

To achieve the above object, the present invention provides a control apparatus of an internal combustion engine in which a variable valve mechanism is provided in an intake valve and an exhaust valve, containing a variable valve control section that controls the variable valve mechanism. In this control apparatus, the variable valve control section makes the lift of the intake valve low and controls the variable valve mechanism in such a manner that opening periods of the intake valve and the exhaust valve provide a negative overlap, during low-load operation of the internal combustion engine, and thereafter controls the variable valve mechanism in such a manner that the opening periods of the intake valve and the exhaust valve provide a positive overlap according to the degree of combustion stability of the internal combustion engine.

Thanks to this configuration, during low-load operation the temperature in the cylinder is controlled by increasing the effective compression ratio and by introducing the internal EGR gas and adhering of the fuel to a piston is prevented, whereby it is possible to stabilize combustion without an increase in pumping loss, which might occur due to intake air throttling.

According to the present invention, during low-load operation it is possible to realize stable combustion while obtaining the pumping loss reducing effect (the fuel consumption reducing effect) that is provided by a variable valve.

DETAILED DESCRIPTION OF THE PREFERRED EMBODIMENTS

Hereinafter, with reference to FIGS. 1 to 9 a description will be given of the configuration and operation of a control apparatus of a spark ignition internal combustion engine according to the first embodiment of the present invention.

First, with reference to FIG. 1 a description will be given of the configuration of a system in which a control apparatus of a spark ignition internal combustion engine according to this embodiment is applied to an automotive gasoline engine.

Figure 1:
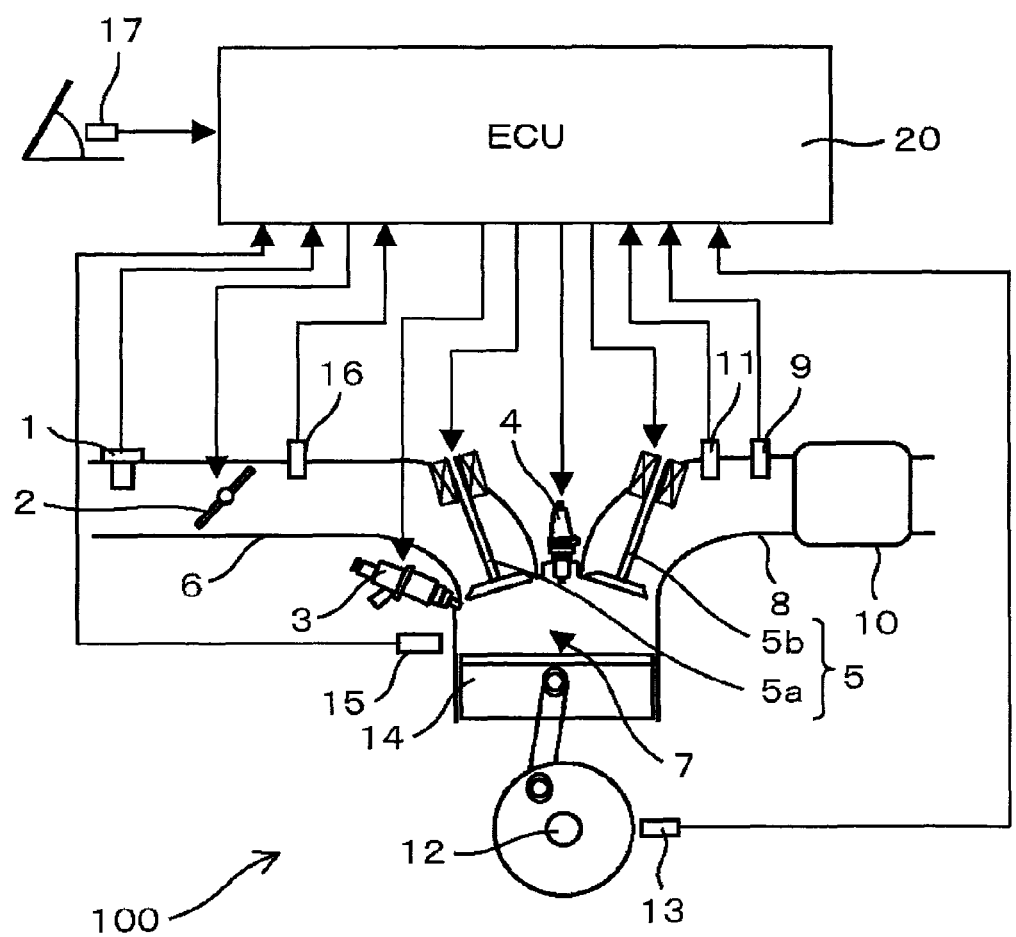
FIG. 1 is a system configuration diagram showing the configuration of a system in which a control apparatus of a spark ignition internal combustion engine according to the first embodiment of the present invention is applied to an automotive gasoline engine.

FIG. 1 is a system configuration diagram showing the configuration of a system in which a control apparatus of a spark ignition internal combustion engine according to the first embodiment of the present invention is applied to an automotive gasoline engine.

An engine 100 is an automotive gasoline engine in which spark ignition combustion is carried out. An air flow sensor 1 that measures the intake air flow, an electronically-controlled throttle 2 that adjusts the intake air flow, and an intake air temperature sensor 16, which is an example of an intake air temperature detector, measures the temperature of the intake air are each provided in appropriate positions of an intake pipe 6. In the engine 100, a fuel injection device (hereinafter called an injector 3) that injects fuel into a combustion chamber enclosed by a cylinder 7 and a piston 14, an ignition plug 4 that supplies ignition energy, and a cooling water temperature sensor 15 that measures the temperature of the cooling water for the engine are each provided in appropriated positions of the cylinder 7. Also, there is provided a variable valve 5, which is made up of an intake valve 5a that adjusts the intake gas flowing into the cylinder and an exhaust valve 5b that adjusts the exhaust gas discharged from within the cylinder, and these components are each provided in appropriate positions of the cylinder 7. The intake air flow and the EGR gas flow in the cylinder are adjusted by adjusting the variable valve 5.

Furthermore, a three-way catalyst 10 that cleans exhaust gas, an air-fuel ratio sensor 9, which is an example of an air-fuel ratio detector, detects the air-fuel ratio of exhaust gas on the upstream side of the three-way catalyst 10, and an exhaust gas temperature sensor 11, which is an example of an exhaust gas temperature detector, detects the temperature of exhaust gas on the upstream side of the three-way catalyst 10 are each provided in appropriate positions of an exhaust pipe 8. Also, a crank angle sensor 13 for calculating rotational angle is provided at a crankshaft 12.

Signals obtained from the air flow sensor 1, the air-fuel ratio sensor 9, the cooling water temperature sensor 15, an intake air temperature sensor 16, the exhaust gas temperature sensor 11, and the crank angle sensor 13 are sent to an engine control unit (an ECU 20). Also, a signal obtained from an accelerator opening sensor 17 is sent to the ECU 20. The accelerator opening sensor 17 detects the stepping-on measurement of the accelerator pedal, i.e., the accelerator opening. The ECU 20 calculates a torque demand on the basis of an output signal of the accelerator opening sensor 17. That is, the accelerator opening sensor 17 is used as a torque demand detection sensor that detects a torque demand to the engine. The ECU 20 calculates the rotation speed of the engine on the basis of an output signal of the crank angle sensor 13. The ECU 20 optimally calculates principal operating variables of the engine, which are air flow rate, fuel injection amount and ignition timing, on the basis of the operating state of the engine obtained from outputs of the above-described various sensors.

The fuel injection amount calculated by the ECU 20 is converted to a valve-opening pulse signal and sent to an injector 3. An ignition plug driving signal is sent to the ignition plug 4 so that ignition is performed at the ignition timing calculated by the ECU 20. The throttle opening calculated by the ECU 20 is sent as a throttle driving signal to the electronically-controlled throttle 2. An operating variable of the variable valve calculated by the ECU 20 is sent as a variable valve driving signal to the variable valve 5.

Fuel is injected to the air that has flown from the intake pipe 6 into the cylinder 7 via the intake valve 5a, whereby a mixture is formed. The mixture explodes due to a spark generated from the ignition plug 4 at a prescribed ignition timing, and pushes down the piston under the combustion pressure thereof, thereby providing the driving force of the engine. Furthermore, the exhaust gas after the explosion is fed into the three-way catalyst 10 via the exhaust pipe 8, and exhaust gas components are cleaned in the three-way catalyst 10 and discharged to the outside.

Next, with reference to FIG. 2 a description will be given of the configuration of the control apparatus of the spark ignition internal combustion engine according to this embodiment.

Figure 2:
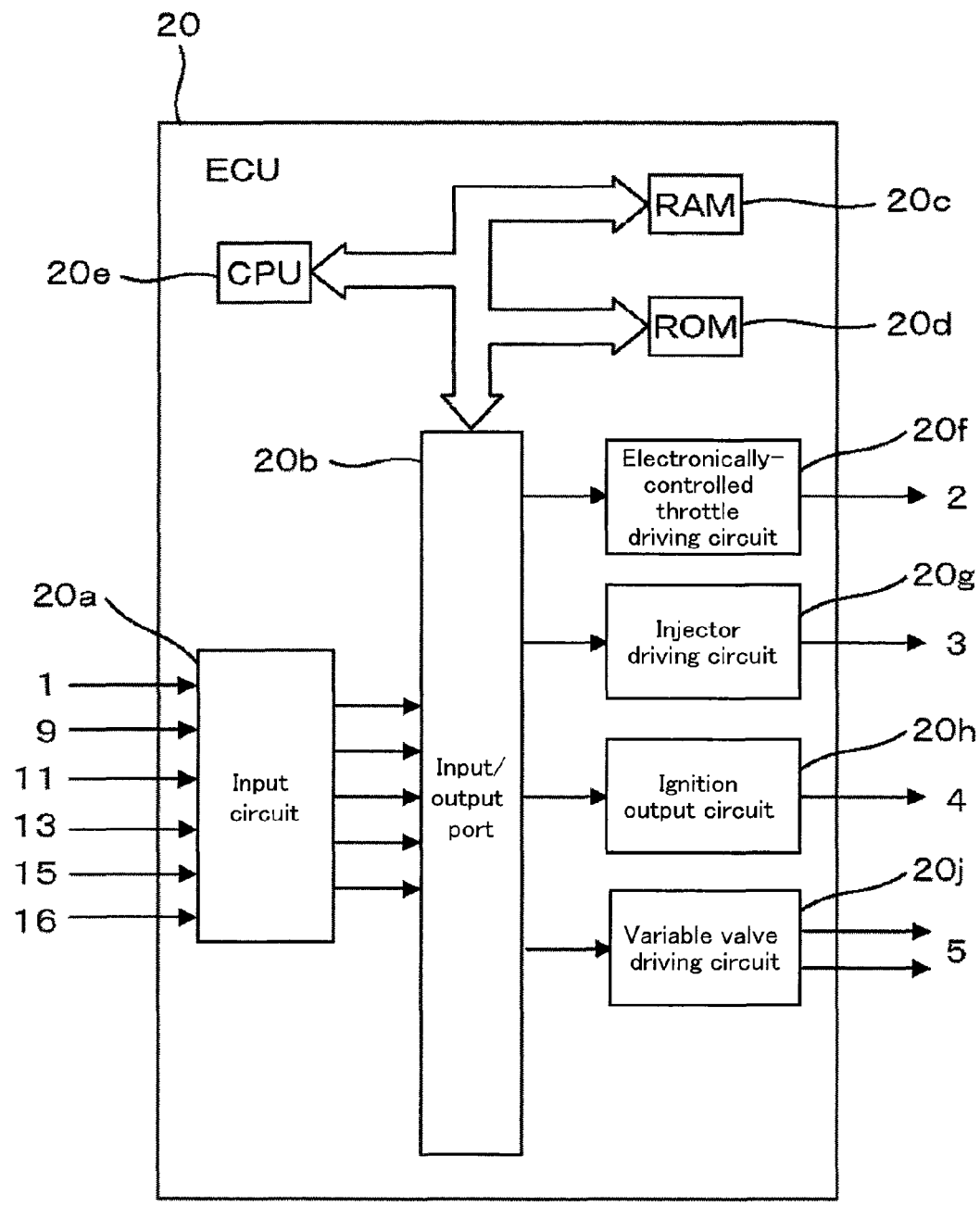
FIG. 2 is a system block diagram showing the configuration of the control apparatus of the spark ignition internal combustion engine according to the first embodiment of the present invention.

FIG. 2 is a system block diagram showing the configuration of the control apparatus of the spark ignition internal combustion engine according to the first embodiment of the present invention.

Output signals of the air flow sensor 1, the air-fuel ratio sensor 9, the exhaust gas temperature sensor 11, the crank angle sensor 13, the cooling water temperature sensor 15, and the intake air temperature sensor 16 are inputted to an input circuit 20a of the ECU 20. However, input signals are not limited to these signals. The input signal of each sensor that has been inputted is sent to an input port within an input/output port 20b. Values sent to the input/output port 20b are saved in a RAM 20c and are subjected to calculation processing in a CPU 20e. A control program in which the details of calculation processing are described is written beforehand in a ROM 20d.

Values indicating the operating variables of each actuator calculated according to the control program are saved in the RAM 20c, thereafter sent to the output port within the input/output port 20b, and sent to each actuator via each driving circuit. In the case of this embodiment, as driving circuits there are provided an electronically-controlled throttle driving circuit 20f, an injector driving circuit 20g, an ignition output circuit 20h, and a variable valve driving circuit 20j, and these circuits control the electronically-controlled throttle 2, the injector 3, the ignition plug 4, and the variable valve 5, respectively. In this embodiment, the apparatus is provided with the above-described driving circuits within the ECU 20. However, this arrangement is not restrictive, but any of the above-described driving circuits may be provided within the ECU 20.

The ECU 20 controls the intake air flow mainly by use of the variable valve 5 and not by use of the electronically-controlled throttle 2, and performs variable valve control and fuel injection control for low load during low-load operation, whereby the ECU 20 prevents combustion from becoming unstable while suppressing an increase in pumping loss. Particularly, the ECU 20 related to this embodiment sets, during low-load operation, the intake valve opening and closing timing to the retard angle side and the exhaust valve opening and closing timing to the advance angle side on the basis of the cooling water temperature, whereby the ECU 20 raises the effective compression ratio and introduces the internal EGR gas. As a result, it is possible to raise the temperature in the combustion chamber without allowing an increase in pumping loss as far as possible and it becomes possible to stabilize combustion during low-load operation.

Next, with reference to FIG. 3 a description will be given of the characteristics of the variable valve in the control apparatus of the spark ignition internal combustion engine according to this embodiment.

Figure 3:
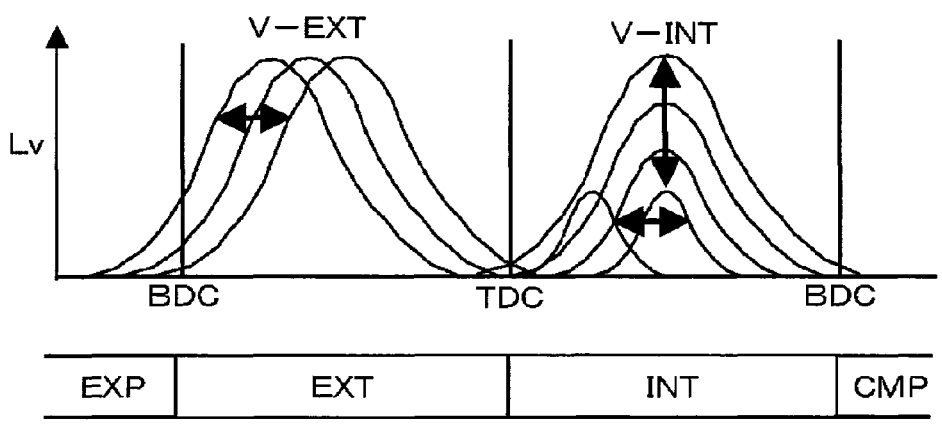
FIG. 3 is an explanatory diagram of the characteristics of a variable valve mechanism in the control apparatus of the spark ignition internal combustion engine according to the first embodiment of the present invention.

FIG. 3 is an explanatory diagram of the characteristics of a variable valve mechanism in the control apparatus of the spark ignition internal combustion engine according to the first embodiment of the present invention. In this embodiment, the intake valve is provided with a continuous variable mechanism of phase and lift amount, and the opening timing and closing timing of the intake valve can be independently controlled. A continuous phase variable mechanism alone is provided in the exhaust valve and the exhaust valve phase can be continuously controlled.

Next with reference to FIG. 4 a description will be given of a low-load operation region in the control apparatus of the spark ignition internal combustion engine according to this embodiment.

Figure 4:
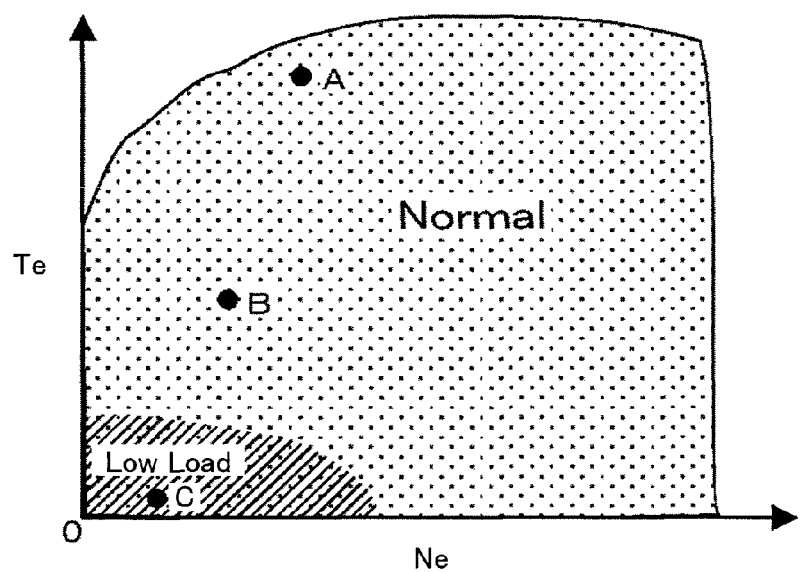
FIG. 4 is an explanatory diagram of a low-load operation region in the control apparatus of the spark ignition internal combustion engine according to the first embodiment of the present invention.

FIG. 4 is an explanatory diagram of a low-load operation region in the control apparatus of the spark ignition internal combustion engine according to the first embodiment of the present invention.

The low-load operation region "Low Load" is fixed beforehand on a map of engine torque "Te" and engine rotation speed "Ne," and is held in the ROM 20d of FIG. 2. From the engine torque and engine rotation speed, the ECU 20 makes a judgment as to whether the present operating condition is in a low-load operation region "Low Load" or a normal operation region "Normal."

As a standard for specifying this region, for example, a region in which the effective compression ratio becomes not more than a given value as a result of intake valve control is regarded as a low-load operation region.

Next, with reference to FIGS. 5 to 9 a description will be given of a variable valve and a fuel injection control method in the control apparatus of the spark ignition internal combustion engine according to this embodiment.

First, with reference to FIG. 5, a description will be given of the content of the variable valve control in the control apparatus of the spark ignition internal combustion engine according to this embodiment.

Figure 5:
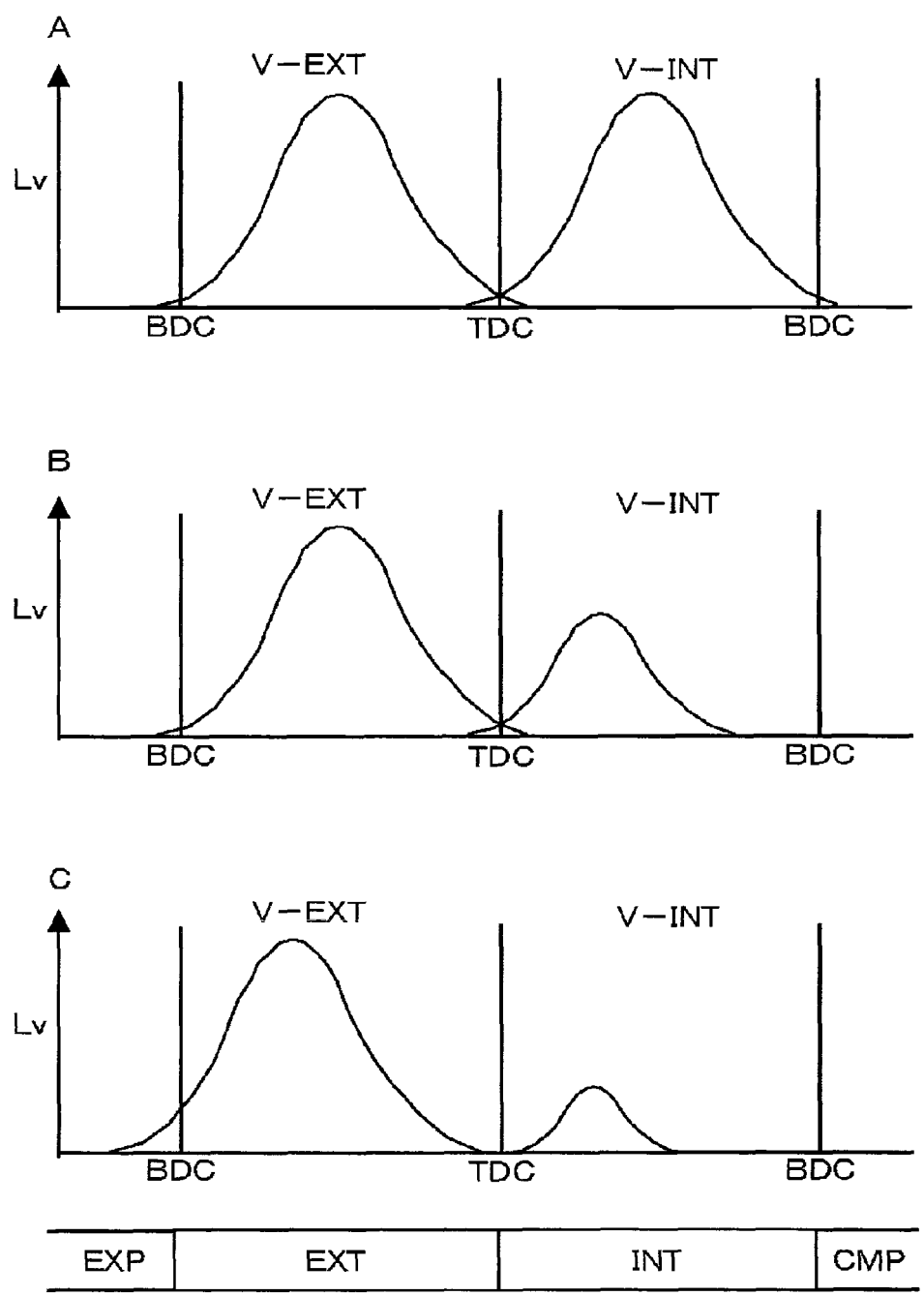
FIG. 5 shows representative examples of the setting of an intake valve and an exhaust valve by the control apparatus of the spark ignition internal combustion engine according to the first embodiment of the present invention.

FIG. 5 shows representative examples of the setting of an intake valve and an exhaust valve under the engine operating conditions A, B and C shown in FIG. 4. In FIG. 5, the abscissa indicates the crank angle and the ordinate indicates the valve lift amount Lv. Incidentally, the solid line V-EXT indicates the lift amount of the exhaust valve and the solid line V-INT indicates the lift amount of the intake valve.

As described earlier, the control apparatus of the spark ignition internal combustion engine according to this embodiment controls the intake air flow mainly by use of the intake valve to reduce pump losses.

Under high-load operating conditions that require a large volume of air, such as A, the intake valve closing timing is set in the vicinity of the bottom dead center. As the load decreases to B and then to C, the intake valve closing timing is advanced in angle, whereby the intake air flow is reduced. However, under the engine operating condition C in a low-load operation region, the intake valve phase is retarded in angle in order to avoid unstable combustion due to a decrease in the effective compression ratio (a decrease in the temperature within the cylinder), with the result that the intake valve opening timing is on the retard angle side compared to the top dead center. Furthermore, at the same time the phase of the exhaust valve is advanced in angle and the exhaust valve closing timing is set to the advance angle side compared to the top dead center (negative overlapping), whereby the internal EGR gas is introduced and pumping losses generated by the retarding of the intake valve phase in angle are held to a minimum.

Next, with reference to FIG. 6 a description will be given of the content of the variable valve control and fuel injection control in the control apparatus of the spark ignition internal combustion engine according to the embodiment of the present invention.

Figure 6:
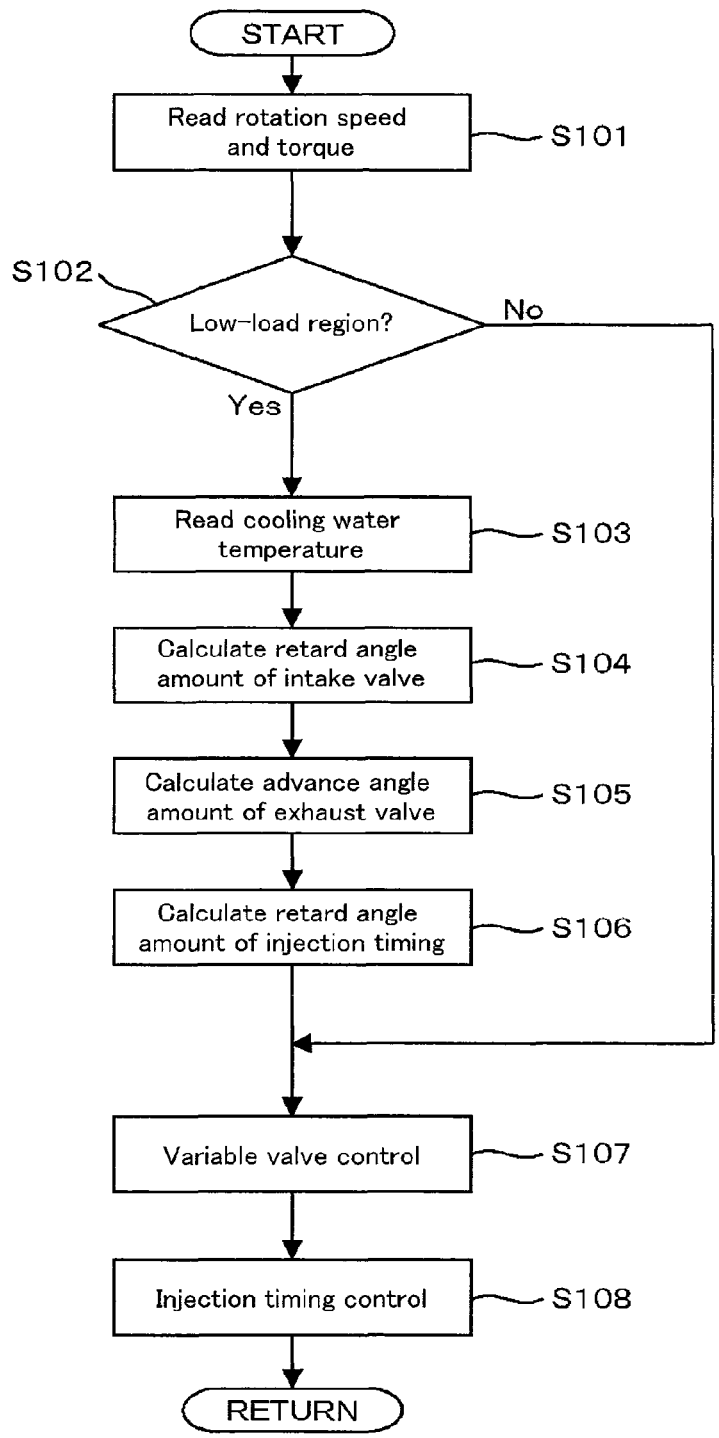
FIG. 6 is a flowchart showing the content of the variable valve control and fuel injection control in the control apparatus of the spark ignition internal combustion engine according to the first embodiment of the present invention.

FIG. 6 is a flowchart showing the content of the variable valve control and fuel injection control in the control apparatus of the spark ignition internal combustion engine according to the first embodiment of the present invention.

The content of the control shown in FIG. 6 is executed by the ECU 20 repeatedly at prescribed intervals.

In Step S101, the ECU 20 reads information on the present engine operating conditions (engine rotation speed, engine torque and the like).

Next, in Step S102, from a map and the like stored beforehand the ECU 20 makes a judgment as to whether the present operating conditions are in a low-load operation region. When the present operating conditions are in a low-load operation region, in Step S103, the ECU 20 reads the present cooling water temperature information. Next, in Step S104, the ECU 20 calculates the retard angle amount of the intake valve from the present engine operating conditions and cooling water temperature. Next, in Step S105, the ECU 20 calculates the retard angle amount of the exhaust valve from the present engine operating conditions and cooling water temperature. Next, in Step S106, the ECU 20 calculates the retard angle amount of the fuel injection timing from the retard angle amount of the intake valve calculated in Step S104. In Step S107, the ECU 20 causes the variable valve to be actually operated by adding the retard angle amount of the intake valve and advance angle amount of the exhaust valve calculated in Steps S104 and S105 to the variable valve setting fixed beforehand on the basis of the engine operating conditions. Subsequently, in Step S108, the ECU 20 causes the injector 3 to be actually operated by adding the retard angle amount of the fuel injection timing calculated in Step S106 to the setting of the fuel injection timing fixed beforehand on the basis of the engine operating conditions.

In contrast to this, when the present operating conditions are not in a low-load operation region, the ECU 20 judges that the present operating conditions are in a normal operation region, and in Step S107, the ECU 20 causes the variable valve to be actually operated according to the variable valve setting fixed beforehand on the basis of the engine operating conditions. Subsequently, in Step S108, the ECU 20 causes the injector 3 to be actually operated according to the setting of the fuel injection timing fixed beforehand on the basis of the engine operating conditions.

Next, with reference to FIGS. 7(A) to 7(C), 8 and 9, a detailed description will be given of the content of the variable valve control and fuel injection control in a low-load operation region by the control apparatus of the spark ignition internal combustion engine according this embodiment.

Figure 7A:
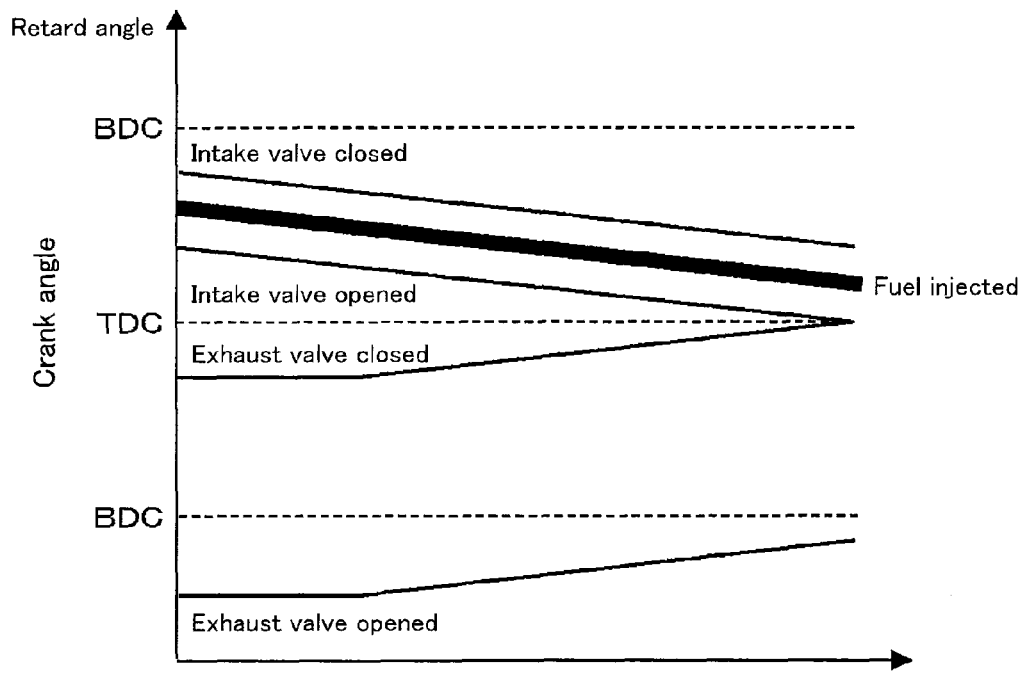
FIGS. 7(A) to 7(C) are diagrams showing controlled variables of the variable valve and controlled variables of the fuel injection timing for the cooling water temperature in a low-load operation region by the control apparatus of the spark ignition internal combustion engine according to the first embodiment of the present invention.
Figure 7B:
Figure 7C:
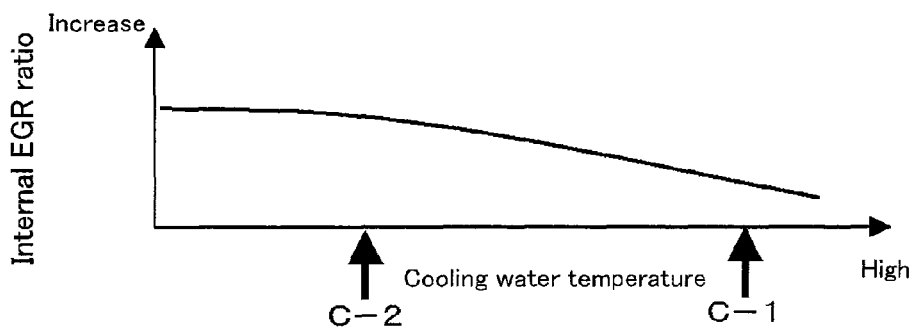

FIGS. 7(A) to 7(C) show controlled variables of the variable valve and controlled variables of the fuel injection timing for the cooling water temperature in a low-load operation region by the control apparatus of the spark ignition internal combustion engine according to the first embodiment of the present invention.

In FIGS. 7(A) to 7(C), the abscissa indicates the cooling water temperature of the engine. The ordinate of FIG. 7(A) indicates the crank angle, the opening and closing timing of the intake valve, the opening and closing timing of the exhaust valve, and the fuel injection timing are plotted. The ordinate of FIG. 7(B) indicates the amount of pumping loss. The ordinate of FIG. 7(C) indicates the internal EGR ratio.

As shown in FIG. 7(A), the opening and closing timing of the intake valve and the opening and closing timing of the exhaust valve are controlled on the basis of the cooling water temperature. On this occasion, as shown in FIG. 7(B), the effective compression ratio (the retard angle amount of the intake valve opening and closing timing) and a reduced amount of pumping loss are in a trade-off relation.

When the cooling water temperature is high, combustion stability is less apt to be affected by a decrease in the effective compression ratio on. Therefore, in order to reduce pumping losses to a maximum degree, the intake valve is controlled to the advance angle side and the exhaust valve is controlled to the retard angle side. Also, it is ensured that the fuel injection timing is a period in which the intake valve operates so that the mixing of the fuel with the air is sufficiently promoted. As the cooling water temperature decreases, the effect of a decrease in the effective compression ratio on combustion stability increases and, therefore, the effective compression ratio is increased by retarding the intake valve phase in angle, whereby combustion stability is improved.

At this time, pumping losses generated by the retarding of the intake valve phase in angle are held to a minimum by advancing the exhaust valve phase in angle (providing a negative overlapping period). As a result of this, the temperature within the cylinder increases because of the introduction of the internal EGR gas and the combustion stability improving effect is also obtained. However, if the internal ERG ratio exceeds a given value, the combustion speed decreases and combustion stability worsens contrary to expectations. Therefore, the advance angle amount of the exhaust valve phase is given limit values.

In order to promote the mixing of the fuel and the air, the fuel injection timing is changed according to a phase change of the intake valve. As a result of this, the fuel injection timing can be retarded in angle when the cooling water temperature is low. Therefore, it becomes possible to reduce the adhering of the fuel to the piston and fuel stability is improved.

Figure 8:
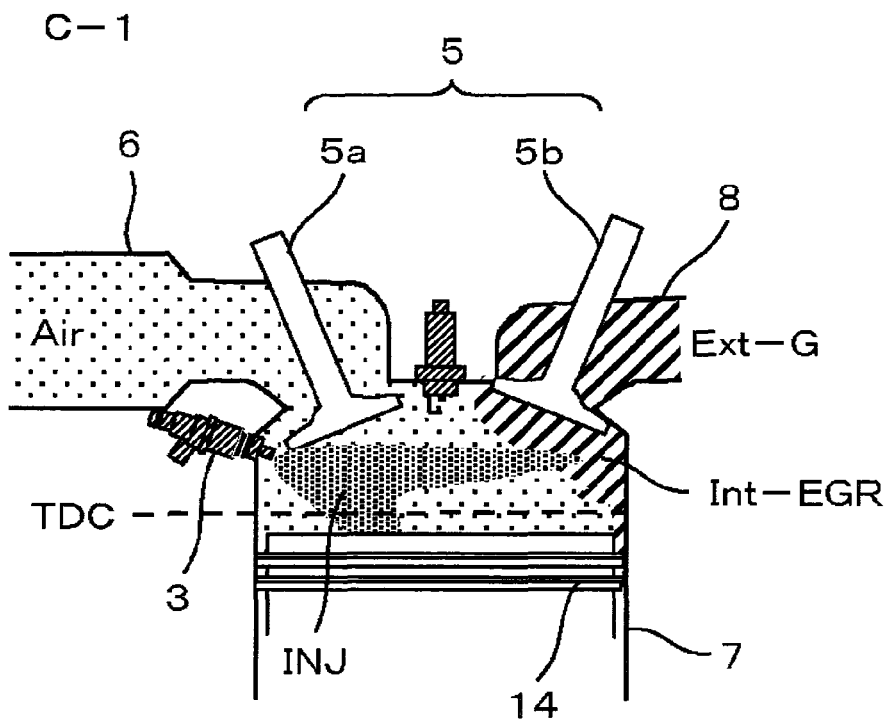
FIG. 8 is an explanatory diagram of the state within the combustion chamber in the intake stroke when the cooling water temperature is relatively high in a low-load operation region by the control apparatus of the spark ignition internal combustion engine according to the first embodiment of the present invention.

FIG. 8 is an explanatory diagram of the state within the combustion chamber in the intake stroke when the cooling water temperature is relatively high (the condition C-1 in FIG. 7) in a low-load operation region by the control apparatus of the spark ignition internal combustion engine according to the first embodiment of the present invention. Incidentally, the same reference numerals as used in FIG. 1 refer to the same parts.

As described earlier, when the cooling water temperature is relatively high, operation is performed, with the amount of the internal EGR (Int-EGR) gas kept small. Also, fuel injection is performed early in accordance with the intake valve opening and closing timing. For this reason, as shown in FIG. 8, the fuel is injected from the injector 3, with the position of the piston 14 kept high, and the injected fuel (INJ) reaches the crown face of the piston 14, with the result that it is impossible to avoid the adhering of the fuel to the piston 14. However, when the cooling water temperature is relatively high, the fuel (INJ) is apt to be atomized and vaporized and, therefore, the effect of the adhering of the fuel to the piston on combustion stability is small.

Figure 9:
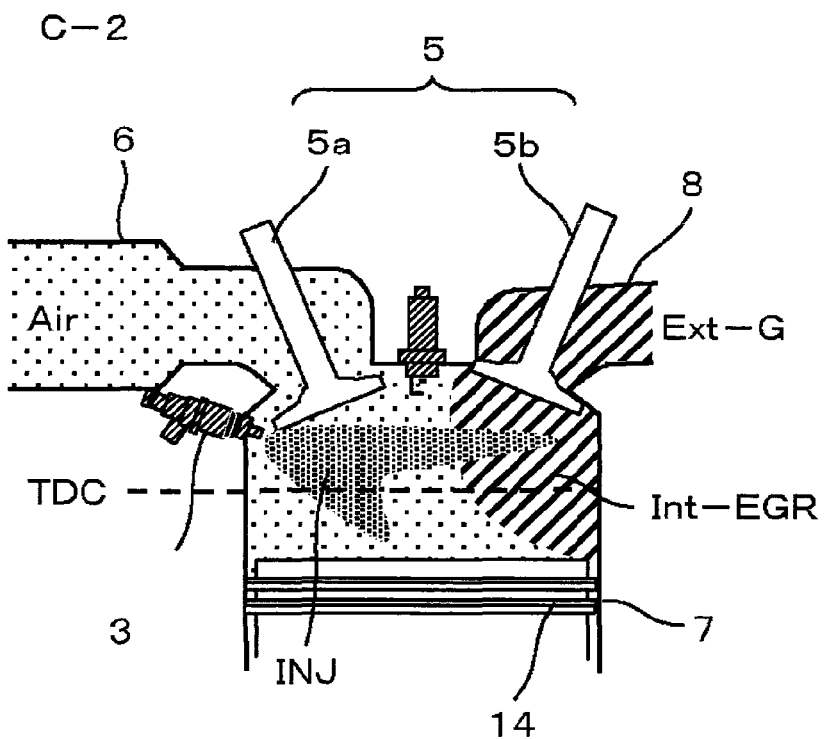
FIG. 9 is an explanatory diagram of the state within the combustion chamber in the intake stroke when the cooling water temperature is relatively low in a low-load operation region by the control apparatus of the spark ignition internal combustion engine according to the first embodiment of the present invention.

FIG. 9 is an explanatory diagram of the state within the combustion chamber in the intake stroke when the cooling water temperature is relatively low (the condition C-2 in FIG. 7) in a low-load operation region by the control apparatus of the spark ignition internal combustion engine according to the first embodiment of the present invention. Incidentally, the same reference numerals as used in FIG. 1 refer to the same parts.

At this time, operation is performed, with the amount of the internal EGR (Int-EGR) gas kept large. When the cooling water temperature is low, the effect of the adhering of the fuel to the piston on combustion stability is great and, therefore, it is essential to suppress the adhering of the fuel to the piston. When the cooling water temperature is low, the control apparatus of the spark ignition internal combustion engine according to this embodiment sets the fuel injection timing on the retard angle side to adapt to the retarding of the intake valve phase in angle. For this reason, as shown in FIG. 9, the position of the piston 14 has lowered sufficiently during fuel injection and the injected fuel (INJ) does not reach the crown face of the piston 14, whereby it is possible to suppress the adhering of the fuel to the piston.

As described above, according to this embodiment, by determining the retard angle amount of the intake valve, the advance angle amount of the exhaust valve and the retard angle amount of the fuel injection timing depending on the cooling water temperature in a low-load region, it is possible to avoid unstable combustion while holding pumping losses to a minimum. For this reason, it is ensured that the fuel reducing effect of intake flow control using the variable valve can exhibits itself to a maximum degree.

Although the variable valve control and the fuel injection control based on changes in the cooling water temperature were described above, similarly, variable valve control and fuel injection control may be performed on the basis of changes in the temperature of the air that is taken in.

Next, with reference to FIGS. 10 and 11 a description will be given below of the configuration and operation of a control apparatus of a spark ignition internal combustion engine according to the second embodiment of the present invention. The configuration of a system in which the control apparatus of the spark ignition internal combustion engine according to this embodiment is applied to an automotive gasoline engine is the same as shown in FIG. 1. The configuration of the control apparatus of the spark ignition internal combustion engine according to this embodiment is the same as shown in FIG. 2. The characteristics of the variable valve in the control apparatus of the spark ignition internal combustion engine according to this embodiment are the same as shown in FIG. 3. The low-load operation region in the control apparatus of the spark ignition internal combustion engine according to this embodiment are the same as shown in FIG. 4. The content of the variable valve control in the control apparatus of the spark ignition internal combustion engine according to this embodiment are the same as shown in FIG. 5.

This embodiment differs from the first embodiment in the point that feedback control of the degree of combustion stability is performed in addition to the variable valve control and fuel injection control based on the cooling water temperature and the intake air temperature in the first embodiment.

Figure 10:
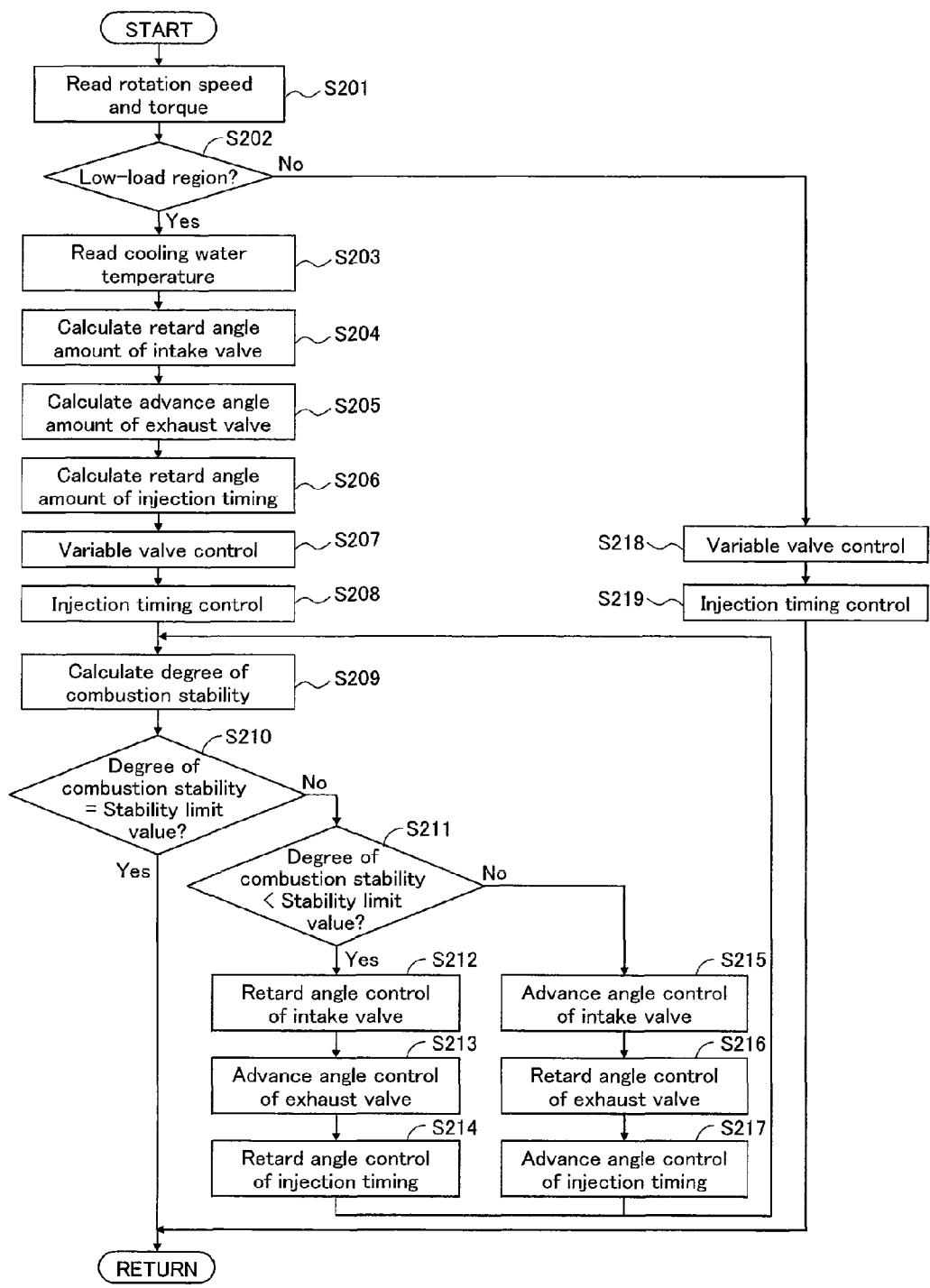
FIG. 10 is a flowchart showing the content of the variable valve control and fuel injection control in a control apparatus of a spark ignition internal combustion engine according to the second embodiment of the present invention.

FIG. 10 is a flowchart showing the content of the variable valve control and fuel injection control in a low-load region by a control apparatus of a spark ignition internal combustion engine according to the second embodiment of the present invention.

The content of the control shown in FIG. 10 is executed by the ECU 20 repeatedly at prescribed intervals.

In Step S201, the ECU 20 reads information on the present engine operating conditions (engine rotation speed, engine torque and the like).

Next, in Step S202, from a map and the like stored beforehand the ECU 20 makes a judgment as to whether or not the present operating conditions are in a low-load operation region. When the present operating conditions are in a low-load operation region, in Step S203, the ECU 20 reads the present cooling water temperature information. Next, in Step S204, the ECU 20 calculates the retard angle amount of the intake valve from the present engine operating conditions and cooling water temperature. Next, in Step S205, the ECU 20 calculates the retard angle amount of the exhaust valve from the present engine operating conditions and cooling water temperature. Next, in Step S206, the ECU 20 calculates the retard angle amount of the fuel injection timing from the retard angle amount of the intake valve calculated in Step S204. In Step S207, the ECU 20 causes the variable valve to be actually operated by adding the retard angle amount of the intake valve and the advance angle amount of the exhaust valve calculated in Steps S204 and S205 to the variable valve setting fixed beforehand on the basis of the engine operating conditions. Subsequently, in Step S208, the ECU 20 causes the injector 3 to be actually operated by adding the retard angle amount of the fuel injection timing calculated in Step S206 to the setting of the fuel injection timing fixed beforehand on the basis of the engine operating conditions. The above-described flow of control to Stage S208 is the same as in the first embodiment.

In this embodiment, next in Step S209, the degree of combustion stability of the engine is detected. The degree of combustion stability is calculated from variations in the rotation calculated from a signal of the crank angle sensor 13, variations in the combustion detected from the air-fuel ratio sensor 9, variations in the combustion calculated from the in-cylinder pressure sensor signal and the like.

Next, the flow of control proceeds to Step 210, where a judgment is made as to whether the detected degree of combustion stability is a stability limit value fixed beforehand. The stability limit value is set with a given allowance in the range of the degree of combustion stability in which the engine is capable of operating normally.

When it is judged that the degree of combustion stability is not the safety limit value, the flow of control proceeds to Step S211.

In Step S211, a judgment is made as to whether the degree of combustion stability is lower than the stability limit value.

When the degree of combustion stability is lower than the stability limit value, in order to improve the degree of combustion stability, the retard angle control of the intake valve is performed in Step S212, the advance angle control of the exhaust valve is performed in Step S213, and the retard angle control of the injection timing is performed in Step S214. After that, the flow of control returns to Step S209 again and the degree of combustion stability is detected. This control is performed repeatedly until the degree of combustion stability becomes equal to the stability limit value.

When the degree of combustion stability is higher than the stability limit value, in order to reduce pumping losses that are in a trade-off relation to the degree of combustion stability, the advance angle control of the intake valve is performed in Step S215, the retard angle control of the exhaust valve is performed in Step S216, and the advance angle control of the injection timing is performed in Step S214. After that, the flow of control returns to Step S209 again and the degree of stability is detected. This control is performed repeatedly until the degree of combustion stability becomes equal to the stability limit value.

In contrast to this, when the present operating conditions are not in a low-load operation region, the ECU 20 judges that the present operating conditions are in a normal operation region, and in Step S218, the ECU 20 causes the variable valve to be actually operated according to the variable valve setting fixed beforehand on the basis of the engine operating conditions. Subsequently, in Step S219, the ECU 20 causes the injector 3 to be actually operated according to the setting of the fuel injection timing fixed beforehand on the basis of the engine operating conditions.

Figure 11A:
FIGS. 11(A) and 11(B) are explanatory diagram of the feedback control of the degree of combustion stability in a low-load operation region by the control apparatus of the spark ignition internal combustion engine according to the second embodiment of the present invention.
Figure 11B:
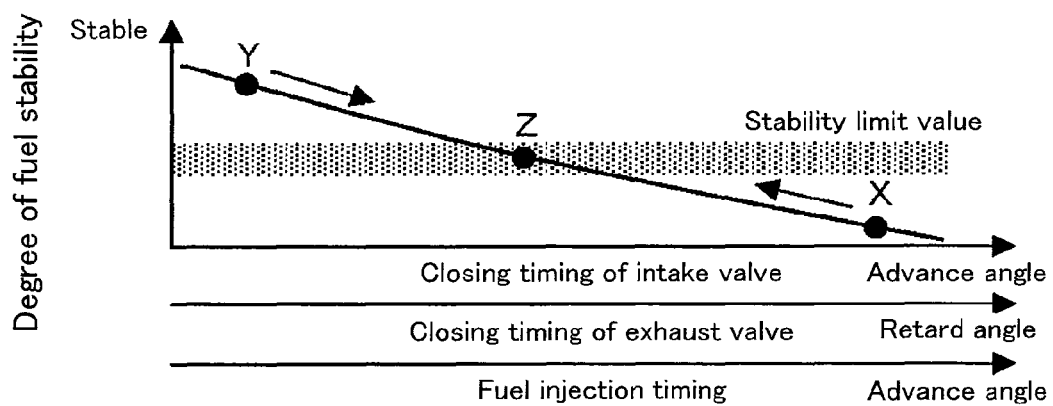

FIGS. 11(A) and 11(B) are explanatory diagrams of the feedback control of the degree of combustion stability in a low-load operation region by the control apparatus of the spark ignition internal combustion engine according to the second embodiment of the present invention.

The abscissa of FIGS. 11(A) and 11(B) indicates the intake valve closing timing, the exhaust valve closing timing and the fuel injection timing. The ordinate of FIG. 11(A) indicates pumping loss and the ordinate of FIG. 11(B) indicates combustion stability. The shaded portion in FIG. 11(B) indicates the stability limit value.

When the detected present degree of combustion stability is not more than the stability limit value (point X in the figure), the effective compression ratio is increased by retarding the intake valve closing timing in angle and advancing the exhaust valve in angle to improve the degree of combustion stability. The fuel injection timing is retarded in angle to adapt to the retard angle of the intake valve closing timing. This control is repeated until the degree of combustion stability is improved and reaches the stability limit value (reaches point Z in the figure).

When the detected present degree of combustion stability is not less than the stability limit value (point Y in the figure), the intake valve closing timing is advanced in angle and the exhaust valve is retarded in angle in order to minimize pumping losses. The fuel injection timing is advanced in angle to adapt to the advancing of the intake valve closing timing in angle. This control is repeated until the degree of combustion stability reaches the stability limit value (reaches point Z in the figure).

According to this embodiment, by detecting the degree of combustion stability in real time during actual driving and feeding back the detected degree of combustion stability to variable valve control and fuel injection control in addition to the feed forward control based on the cooling water temperature and the intake air temperature, it is possible to hold pumping losses to a minimum while maintaining combustion stability in any situation, such as secular changes in the engine and engine parts and changes in the environment, with the result that it is ensured that the fuel reducing effect can exhibits itself to a maximum degree.

Next, with reference to FIGS. 12 to 17 a description will be given of the configuration and operation of a control apparatus of a spark ignition internal combustion engine according to the third embodiment of the present invention.

Figure 12:
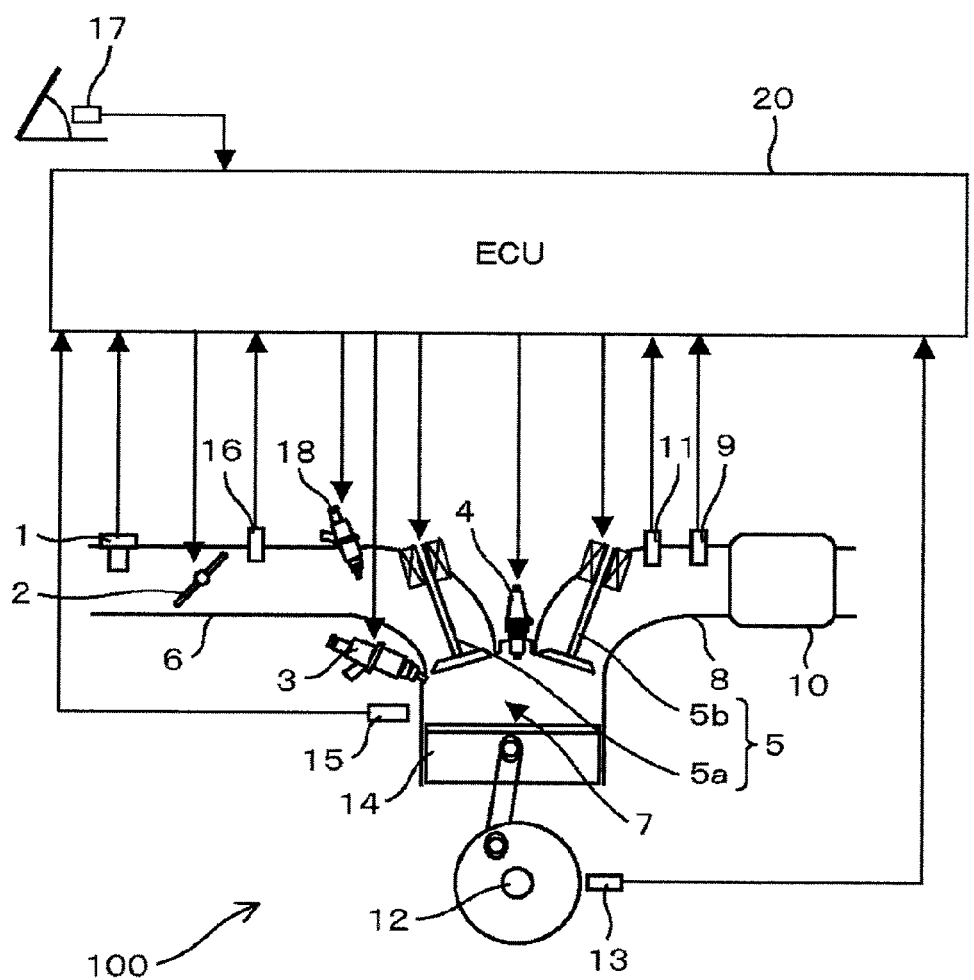
FIG. 12 is a diagram showing the configuration of a system in which a control apparatus of a spark ignition internal combustion engine according to the third embodiment of the present invention is applied to an automotive gasoline engine.

FIG. 12 shows the configuration of a system in which a control apparatus of a spark ignition internal combustion engine according to this embodiment to an automotive gasoline engine. In this embodiment, an injector 18 that injects fuel to the interior of the intake port is provided in an appropriate position of the intake pipe 6 in addition to the system configuration of the first embodiment shown in FIG. 1.

Figure 13:
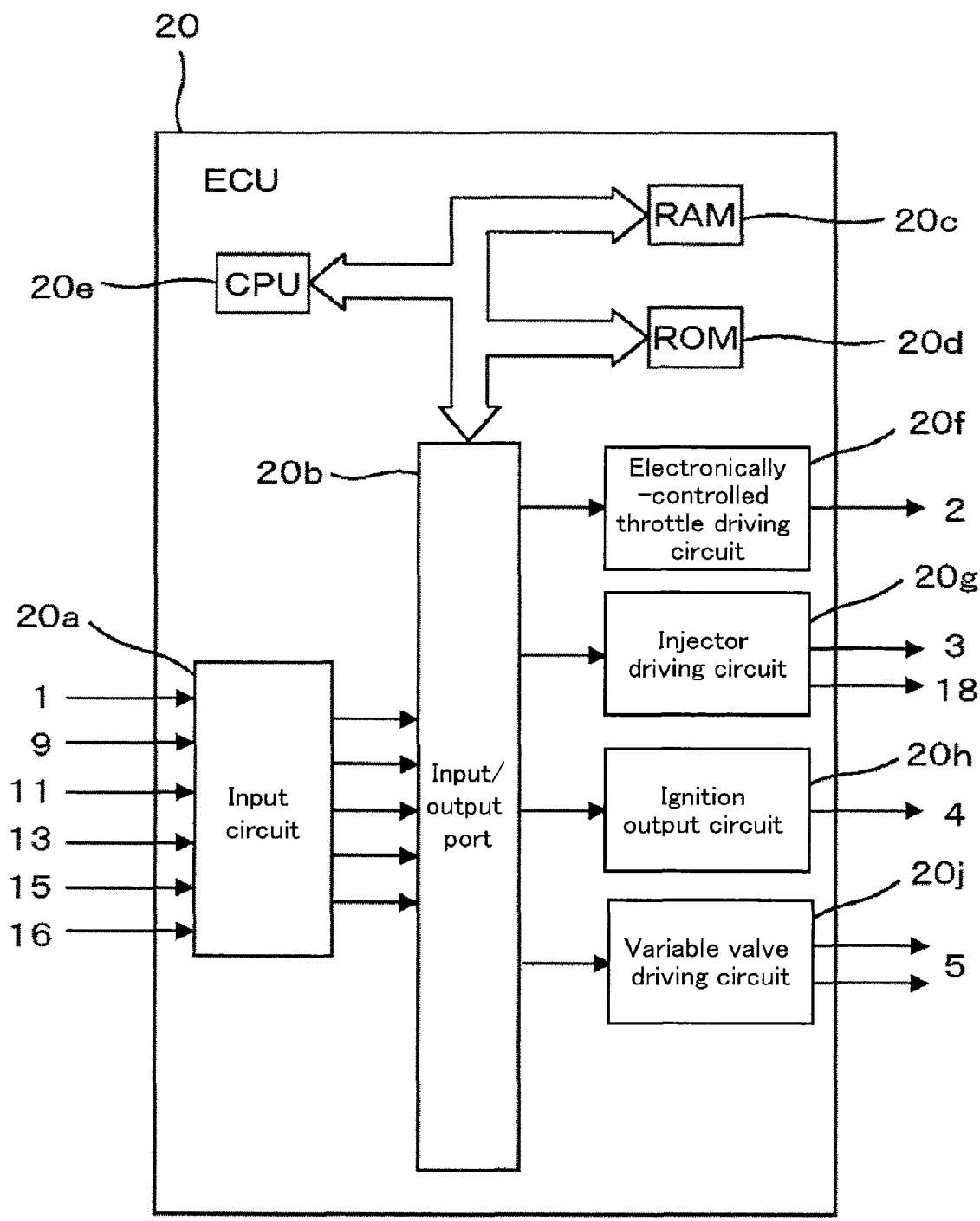
FIG. 13 is a system block diagram showing the configuration of the control apparatus of the spark ignition internal combustion engine according to the third embodiment of the present invention.

FIG. 13 is a system block diagram showing the configuration of the control apparatus of the spark ignition internal combustion engine according to this embodiment. This configuration is basically the same as the configuration of the control apparatus of the spark ignition internal combustion engine according to the first embodiment of the present invention shown in FIG. 2. In this embodiment, however, the injector driving circuit 20g controls not only the injector 3 for injection into the cylinder, but also the intake port injector 18. This is the feature of this embodiment.

The characteristics of the variable valve in the control apparatus of the spark ignition internal combustion engine according to this embodiment are the same as shown in FIG. 3. The low-load operation region in the control apparatus of the spark ignition internal combustion engine according to this embodiment are the same as shown in FIG. 4. The content of the variable valve control in the control apparatus of the spark ignition internal combustion engine according to this embodiment are the same as shown in FIG. 5.

Figure 14:
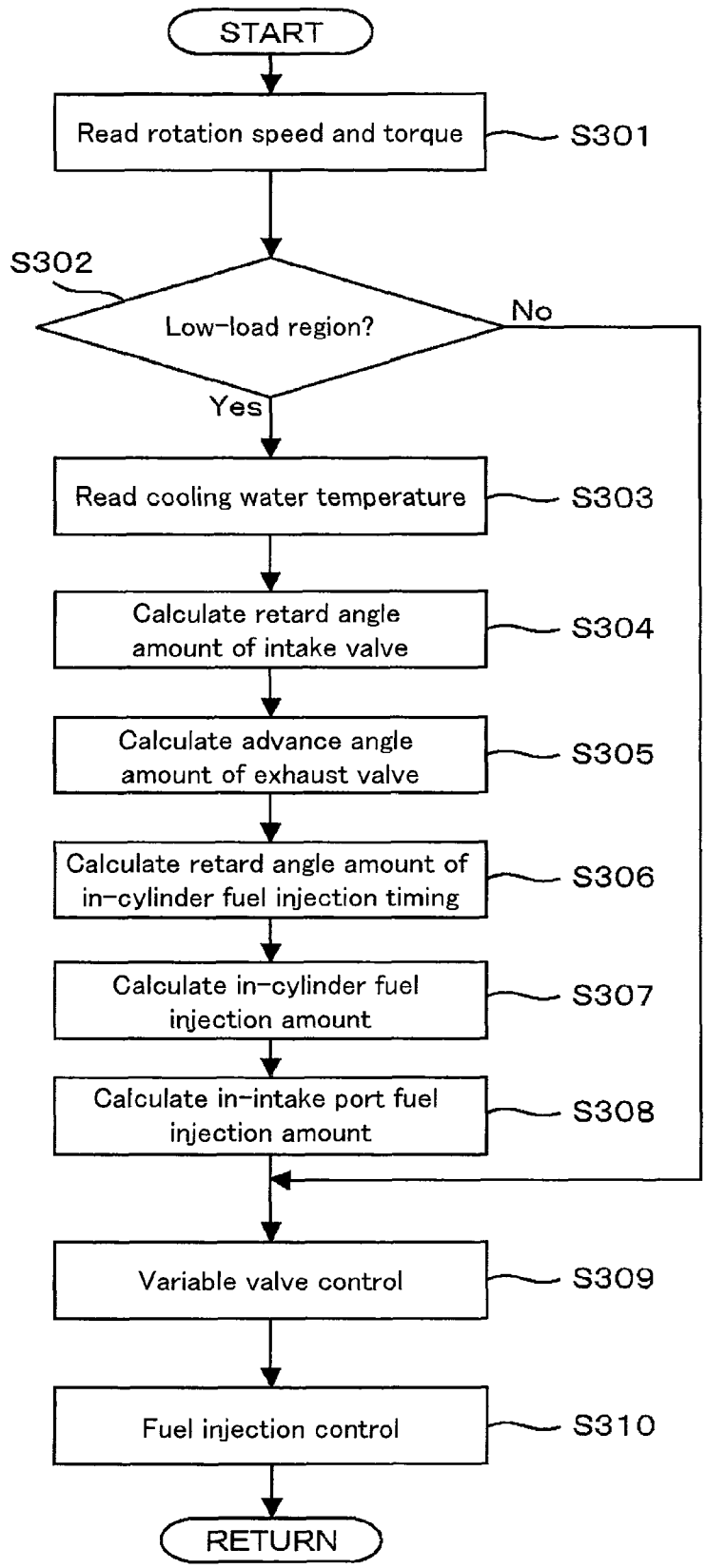
FIG. 14 is a flowchart showing the content of the variable valve control and fuel injection control in the control apparatus of the spark ignition internal combustion engine according to the third embodiment of the present invention.

FIG. 14 is a flowchart showing the content of the variable valve control and fuel injection control in the control apparatus of the spark ignition internal combustion engine according to the third embodiment of the present invention.

The content of the control shown in FIG. 14 is executed by the ECU 20 repeatedly at prescribed intervals.

In Step S301, the ECU 20 reads information on the present engine operating conditions (engine rotation speed, engine torque and the like).

Next, in Step S302, from a map and the like stored beforehand the ECU 20 makes a judgment as to whether or not the present operating conditions are in a low-load operation region. When the present operating conditions are in a low-load operation region, in Step S303, the ECU 20 reads the present cooling water temperature information. Next, in Step S304, the ECU 20 calculates the retard angle amount of the intake valve from the present engine operating conditions and cooling water temperature. Next, in Step S305, the ECU 20 calculates the retard angle amount of the exhaust valve from the present engine operating conditions and cooling water temperature. Next, in Step S306, the ECU 20 calculates the retard angle amount of the fuel injection timing by the injector 3 for injection into the cylinder from the retard angle amount of the intake valve calculated in Step S304. Next, in Step S307, the fuel injection amount by the injector 3 for injection into the cylinder is calculated from the retard angle amount of the fuel injection timing calculated in Step S306. Subsequently, in Step S308, the fuel injection amount by the intake port injector 18 is calculated from the fuel injection amount by the injector 3 for injection into the cylinder.

Next, in Step S309, the ECU 20 causes the variable valve to be actually operated by adding the retard angle amount of the intake valve and advance angle amount of the exhaust valve calculated in Steps S304 and S305 to the variable valve setting fixed beforehand on the basis of the engine operating conditions. Subsequently, in Step S310, the ECU 20 causes the injector 3 for injection into the cylinder the intake port injector 18 to be actually operated by adding the retard angle amount of the fuel injection timing by the injector 3 for injection into the cylinder and the fuel injection amount of the intake port injector 18 calculated in Steps S306 to S308 to the settings of the fuel injection for injection into the cylinder and for the intake port fixed beforehand on the basis of the engine operating conditions.

In contrast to this, when the present operating conditions are not in a low-load operation region, the ECU 20 judges that the present operating conditions are in a normal operation region, and in Step S309, the ECU 20 causes the variable valve 5 to be actually operated according to the variable valve setting fixed beforehand on the basis of the engine operating conditions. Subsequently, in Step S310, the ECU 20 causes the injector 3 for injection into the cylinder and the intake port injector 18 to be actually operated according to the setting of the fuel injection timing fixed beforehand on the basis of the engine operating conditions.

Next, with reference to FIGS. 15(A) to 15(D), 16 and 17, a detailed description will be given of the content of the variable valve control and fuel injection control in a low-load operation region by the control apparatus of the spark ignition internal combustion engine according this embodiment.

FIGS. 15(A) to 15(D) show controlled variables of the variable valve and controlled variables of the fuel injection timing and fuel injection amount for the cooling water temperature in a low-load operation region by the control apparatus of the spark ignition internal combustion engine according to the third embodiment of the present invention.

In FIGS. 15(A) to 15(D), the abscissa indicates the cooling water temperature of the engine. The ordinate of FIG. 15(A) indicates the crank angle, the opening and closing timing of the intake valve, the opening and closing timing of the exhaust valve, and the fuel injection timing by the injector 3 for injection into the cylinder are plotted. The ordinate of FIG. 15(B) indicates the fuel injection amount. The ordinate of FIG. 15(C) indicates the pumping loss amount. The ordinate of FIG. 15(D) indicates the internal EGR ratio.

Figure 15A:
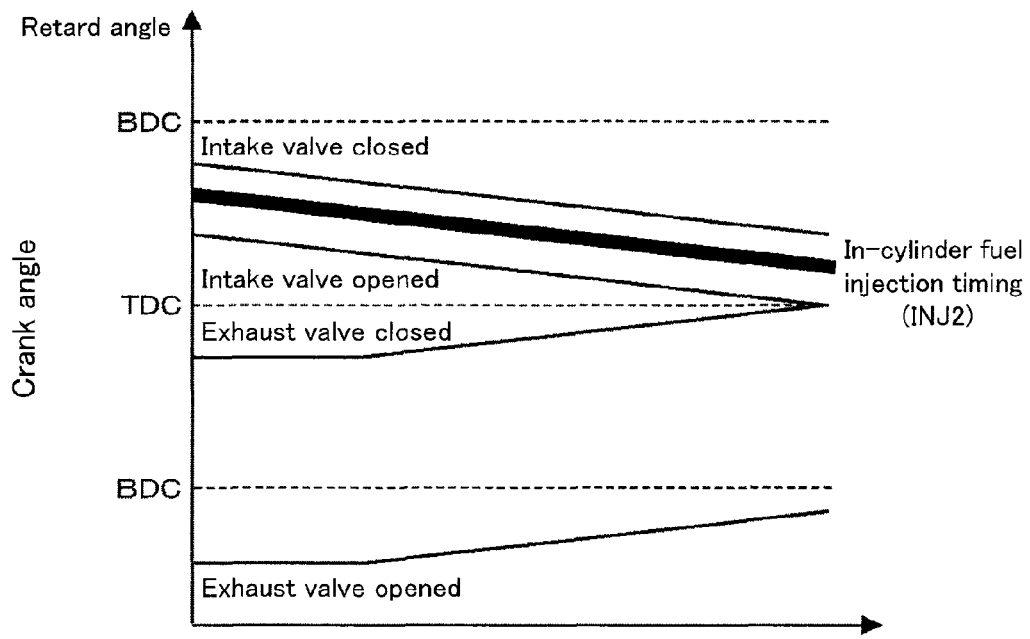
FIGS. 15(A) to 15(D) are diagrams showing controlled variables of the variable valve and controlled variables of the fuel injection timing and fuel injection amount for the cooling water temperature in a low-load operation region by the control apparatus of the spark ignition internal combustion engine according to the third embodiment of the present invention.
Figure 15B:
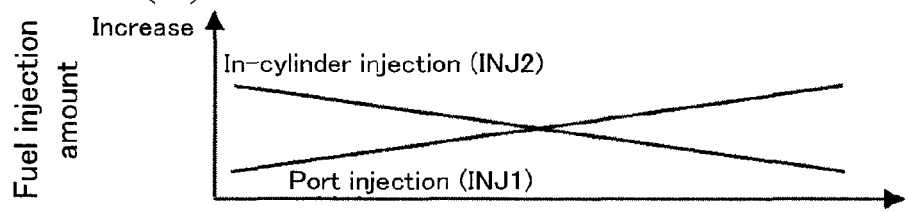
Figure 15C:
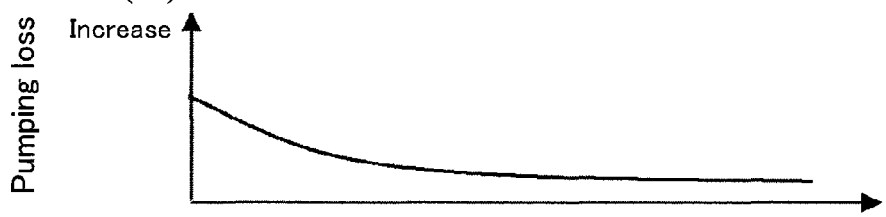
Figure 15D:
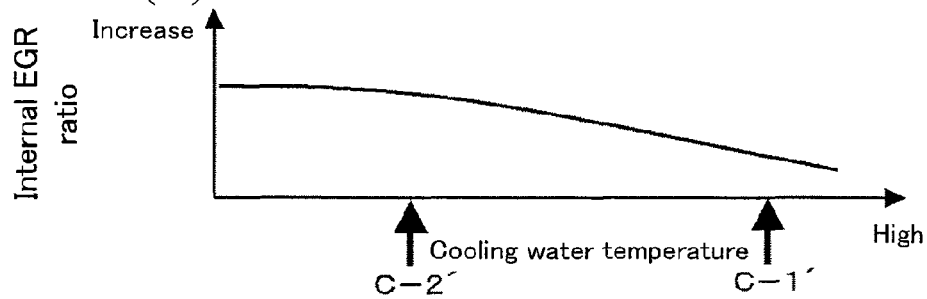

As shown in FIG. 15(A), the opening and closing timing of the intake valve and the opening and closing timing of the exhaust valve are controlled on the basis of the cooling water temperature. On this occasion, as shown in FIG. 15(C), the effective compression ratio (the retard angle amount of the intake valve closing timing) and a reduced amount of pumping loss are in a trade-off relation.

When the cooling water temperature is high, combustion stability is less apt to be affected by a decrease in the effective compression ratio. Therefore, in order to reduce pumping losses to a maximum degree, the intake valve is controlled to the advance angle side and the exhaust valve is controlled to the retard angle side. Also, it is ensured that the fuel injection timing by the injector 3 for injection into the cylinder is a period in which the intake valve operates so that the mixing of the fuel with the air is sufficiently promoted. On this occasion, the fuel injection amount by the injector 3 for injection into the cylinder is reduced, whereby penetration is controlled and the adhering of the fuel to the piston is reduced. The remaining amount of fuel necessary for obtaining a desired torque is injected by the intake port injector 18.

Because the effect of a decrease in the effective compression ratio on combustion stability increases as the cooling water temperature decreases, the effective compression ratio is increased by retarding the intake valve phase in angle and combustion stability is improved. At this time, pumping losses generated by the retarding of the intake valve phase in angle are held to a minimum by advancing the exhaust valve phase in angle (providing a negative overlapping period). As a result of this, the temperature within the cylinder increases because of the introduction of the internal EGR gas and the combustion stability improving effect is also obtained. However, if the internal ERG ratio exceeds a given value, the combustion speed decreases and combustion stability worsens contrary to expectations. Therefore, the advance angle amount of the exhaust valve phase is given limit values.

In order to promote the mixing of the fuel and the air, the fuel injection timing by the injector 3 for injection into the cylinder is changed according to a phase change of the intake valve. At this time, the distance from the injector 3 to the crown face of the piston 14 increases during fuel injection and, therefore, the fuel injection amount by the injector 3 for injection into the cylinder is increased in a range in which the adhering of the fuel to the piston does not occur, and the fuel injection amount by the intake port injector 18 is reduced.

Figure 16:
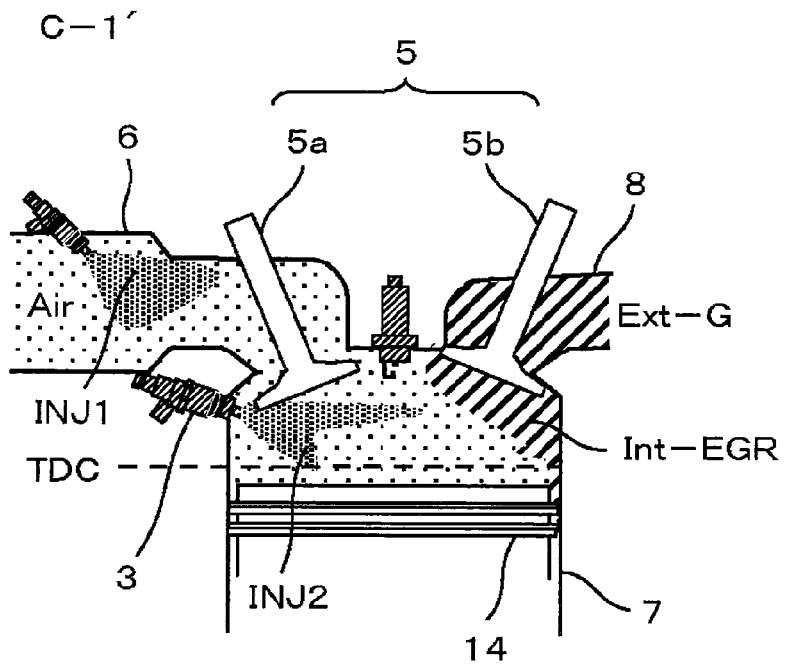
FIG. 16 is an explanatory diagram of the state within the combustion chamber in the intake stroke when the cooling water temperature is relatively high in a low-load operation region by the control apparatus of the spark ignition internal combustion engine according to the third embodiment of the present invention.

FIG. 16 is an explanatory diagram of the state within the combustion chamber in the intake stroke when the cooling water temperature is relatively high (the condition C-1' in FIG. 15) in a low-load operation region by the control apparatus of the spark ignition internal combustion engine according to the third embodiment of the present invention. Incidentally, the same reference numerals as used in FIG. 12 refer to the same parts.

As described earlier, when the cooling water temperature is relatively high, operation is performed, with the amount of the internal EGR (Int-EGR) gas kept small. Also, fuel injection (INJ2) by the injector 3 for injection into the cylinder is performed early in accordance with the intake valve opening and closing timing. For this reason, as shown in FIG. 16, the fuel is injected from the injector 3 for injection into the cylinder, with the position of the piston 14 kept high. Therefore, in order to ensure that the fuel (INJ2) injected by the injector 3 for injection into the cylinder does not reach the crown face of the piston 14, penetration is reduced by reducing the fuel injection amount (INJ2) by the injector 3 for injection into the cylinder and the adhering of the fuel to the piston 14 is avoided. On that occasion, fuel necessary for obtaining a desired torque is made up through the fuel injection (INJ1) by the intake port injector 18.

Figure 17:
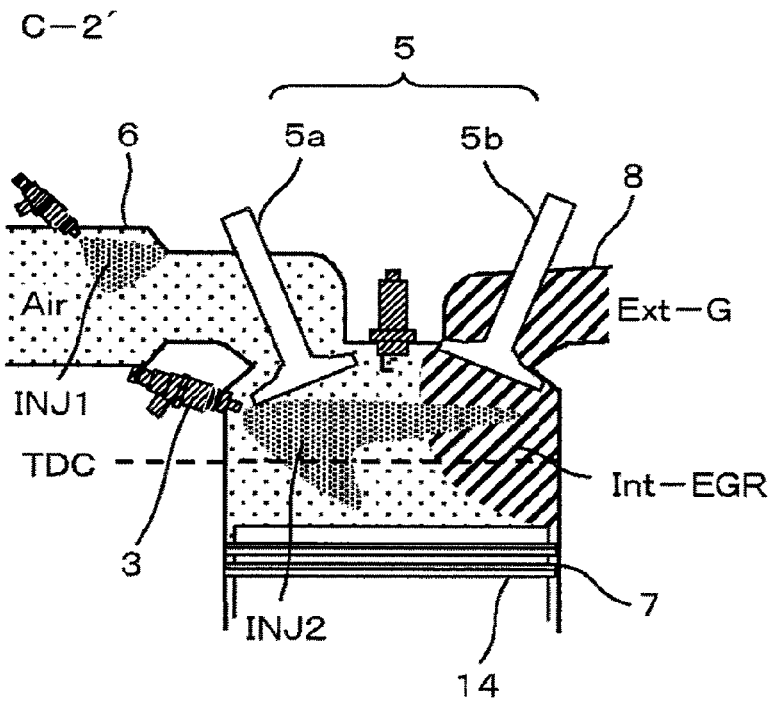
FIG. 17 is an explanatory diagram of the state within the combustion chamber in the intake stroke when the cooling water temperature is relatively low in a low-load operation region by the control apparatus of the spark ignition internal combustion engine according to the third embodiment of the present invention.

FIG. 17 is an explanatory diagram of the state within the combustion chamber in the intake stroke when the cooling water temperature is relatively low (the condition C-2' in FIG. 15) in a low-load operation region by the control apparatus of the spark ignition internal combustion engine according to the third embodiment of the present invention. Incidentally, the same reference numerals as used in FIG. 12 refer to the same parts.

At this time, operation is performed, with the amount of the internal EGR (Int-EGR) gas kept large. The fuel injection timing by the injector 3 for injection into the cylinder is set to the retard angle side to adapt to the retarding of the intake valve phase in angle. For this reason, as show in FIG. 17, the position of the piston 14 has lowered sufficiently during fuel injection by the injector 3 for injection into the cylinder. Therefore, the fuel injection amount (INJ2) by the injector 3 for injection into the cylinder is increased in a range in which the adhering of the fuel to the piston does not occur, and the fuel injection amount (INJ1) by the intake port injector 18 is reduced by just that much.

As described above, according to this embodiment, the fuel injection amount by the injector 3 for injection into the cylinder and the fuel injection amount by the intake port injector 18 is changed according to the change of the fuel injection timing by the injector 3 for injection into the cylinder, whereby it is possible to avoid the adhering of the fuel to the piston 14 by controlling the penetration of the injector 3 for injection into the cylinder. As a result of this, variations in mixture formation are reduced and it becomes possible to stabilize combustion.

Incidentally, in the above description, in a low-load region the fuel injection amount by the injector 3 for injection into the cylinder was changed on the basis of the cooling water temperature. However, in a low-load region, it is also possible to adopt a method that involves positively avoiding unstable combustion due to the adhering of the fuel to the piston 14 by performing control in such a manner that the whole quantity of fuel is injected by use of the intake port injector 18 without carrying out injection by use of the injector 3 for injection into the cylinder irrespective of the cooling water temperature.

In the above description, variable valve control and fuel injection control were performed on the basis of the cooling water temperature in a low-load region. However, variable valve control and fuel injection control may also be performed on the basis of the intake air temperature.

Next, with reference to FIG. 18 a description will be given of a control apparatus of a spark ignition internal combustion engine according to the fourth embodiment of the present invention.

The configuration of a system in which the control apparatus of the spark ignition internal combustion engine according to this embodiment is applied to an automotive gasoline engine is the same as shown in FIG. 12. The configuration of the control apparatus of the spark ignition internal combustion engine according to this embodiment is the same as shown in FIG. 13. The characteristics of the variable valve in the control apparatus of the spark ignition internal combustion engine according to this embodiment are the same as shown in FIG. 3. The low-load operation region in the control apparatus of the spark ignition internal combustion engine according to this embodiment are the same as shown in FIG. 4. The content of the variable valve control in the control apparatus of the spark ignition internal combustion engine according to this embodiment are the same as shown in FIG. 5.

This embodiment differs from the third embodiment in the point that feedback control of the degree of combustion stability is performed in addition to the variable valve control and fuel injection control based on the cooling water temperature or the intake air temperature in the third embodiment.

Figure 18:
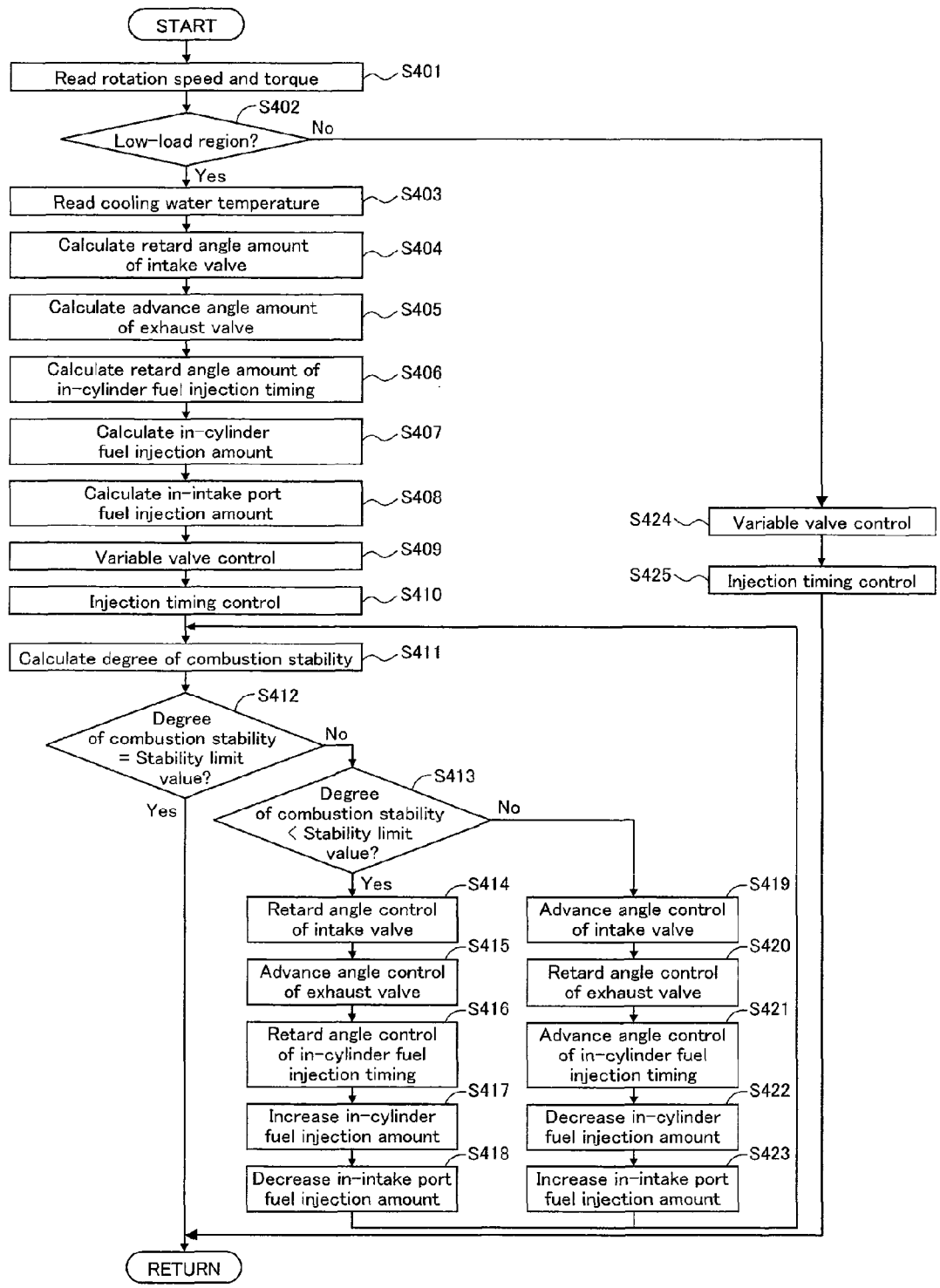
FIG. 18 is a flowchart showing the content of the variable valve control and fuel injection control in a control apparatus of a spark ignition internal combustion engine according to the fourth embodiment of the present invention.

FIG. 18 is a flowchart showing the content of the variable valve control and fuel injection control in a low-load operation region by a control apparatus of a spark ignition internal combustion engine according to the fourth embodiment of the present invention.

The content of the control shown in FIG. 18 is executed by the ECU 20 repeatedly at prescribed intervals.

In Step S401, the ECU 20 reads information on the present engine operating conditions (engine rotation speed, engine torque and the like).

Next, in Step S402, from a map and the like stored beforehand the ECU 20 makes a judgment as to whether or not the present operating conditions are in a low-load operation region. When the present operating conditions are in a low-load operation region, in Step S403, the ECU 20 reads the present cooling water temperature information. Next, in Step S404, the ECU 20 calculates the retard angle amount of the intake valve from the present engine operating conditions and cooling water temperature. Next, in Step S405, the ECU 20 calculates the retard angle amount of the exhaust valve from the present engine operating conditions and cooling water temperature. Next, in Step S406, the ECU 20 calculates the retard angle amount of the fuel injection timing by the injector 3 for injection into the cylinder from the retard angle amount of the intake valve calculated in Step S404. Next, in Step S407, the ECU 20 calculates the fuel injection amount by the injector 3 for injection into the cylinder from the retard angle amount of the fuel injection timing calculated in Step S406. Subsequently, in Step S408, the ECU 20 calculates the fuel injection amount by the intake port injector 18 from the fuel injection amount by the injector 3 for injection into the cylinder calculated in Step S407.

Next, in Step S409, the ECU 20 causes the variable valve to be actually operated by adding the retard angle amount of the intake valve and advance angle amount of the exhaust valve calculated in Steps S404 and S405 to the variable valve setting fixed beforehand on the basis of the engine operating conditions. Subsequently, in Step S410, the ECU 20 causes the injector 3 for injection into the cylinder and the intake port injector 18 to be actually operated by adding the retard angle amount of the fuel injection timing and the fuel injection amounts by the injector 3 for injection into the cylinder and the intake port injector 18 calculated in Steps S406 to S408 to the fuel injection settings for injection into the cylinder and for the intake port fixed beforehand on the basis of engine operating conditions. The above-described flow of control is the same as in the third embodiment.

In this embodiment, next in Step S411, the degree of combustion stability of the engine is detected. The degree of combustion stability is calculated from variations in the rotation calculated from a signal of the crank angle sensor 13, variations in the combustion detected from the air-fuel ratio sensor 9, variations in the combustion calculated from the in-cylinder pressure sensor signal and the like.

Next, the flow of control proceeds to Step 412, where a judgment is made as to whether the detected degree of combustion stability is a stability limit value fixed beforehand. The stability limit value is set with a given allowance in the range of the degree of combustion stability in which the engine is capable of operating normally.

When it is judged that the degree of combustion stability is not the safety limit value, the flow of control proceeds to Step S413.

In Step S413, a judgment is made as to whether the degree of combustion stability is lower than the stability limit value.

When the degree of combustion stability is lower than the stability limit value, in order to improve the degree of combustion stability, the retard angle control of the intake valve is performed in Step S414, the advance angle control of the exhaust valve is performed in Step S415, and the retard angle control of the in-cylinder fuel injection timing is performed in Step S416. The in-cylinder fuel injection amount is increased in Step S417 and the in-intake port fuel injection amount is reduced in Step S418. After that, the flow of control returns to Step S411 again and the degree of combustion stability is detected. This control is performed repeatedly until the degree of combustion stability becomes equal to the stability limit value.

When the degree of combustion stability is higher than the stability limit value, in order to reduce pumping losses that are in a trade-off relation to the degree of combustion stability as far as possible, the advance angle control of the intake valve is performed in Step S419, the retard angle control of the exhaust valve is performed in Step S420, and the advance angle control of the in-cylinder fuel injection timing is performed in Step S421. The in-cylinder fuel injection amount is decreased in Step S422 and the in-intake port fuel injection amount is increased in Step S423. After that, the flow of control returns to Step S411 again and the degree of combustion stability is detected. This control is performed repeatedly until the degree of combustion stability becomes equal to the stability limit value.

In contrast to this, when the present operating conditions are not in a low-load operation region, the ECU 20 judges that the present operating conditions are in a normal operation region, and in Step S424, the ECU 20 causes the variable valve 5 to be actually operated according to the variable valve setting fixed beforehand on the basis of the engine operating conditions. Subsequently, in Step S425, the ECU 20 causes the injector 3 for injection into the cylinder and the intake port injector 18 to be actually operated according to the setting of the fuel injection timing fixed beforehand on the basis of the engine operating conditions.

As described above, according to this embodiment, by detecting the degree of combustion stability in real time during actual driving and by feeding back the detected degree of combustion stability to variable valve control and fuel injection control in addition to the feedforward control based on the cooling water temperature and the intake air temperature, it is possible to avoid the adhering of the fuel to the piston 14 by optimally controlling the penetration of the injector 3 for injection into the cylinder in any situation, such as secular changes in the engine and engine parts and changes in the environment. As a result, variations in mixture formation are reduced and it is possible to suppress pumping losses to a minimum while maintaining combustion stability.

In the above description, in a low-load region, variable valve control and fuel injection control were performed on the basis of the cooling water temperature. However, variable valve control and fuel injection control may be performed on the basis of the intake air temperature.

Incidentally, the present invention is not limited to each of the above-described embodiments, but various modifications and changes can be made so long as these do not depart from the gist of the present invention described in the claims.

What is claimed is:

1. A control apparatus of an internal combustion engine in which a variable valve mechanism is provided in an intake valve and an exhaust valve, comprising:
    a variable valve control section that controls the variable valve mechanism and a fuel injection control section that controls fuel directly injected into a cylinder of the internal combustion engine,
    wherein the variable valve control section makes the lift of the intake valve low and controls the variable valve in such a manner that opening periods of the intake valve and the exhaust valve provide a negative overlap, during low-load operation of the internal combustion engine, and thereafter adjusts at least either of the opening timing of the intake valve and the closing timing of the exhaust valve according to the degree of combustion stability, which is obtained on the basis of at least any one of the temperature of a cooling medium of the internal combustion engine, the temperature of intake air taken in the internal combustion engine, and the wall temperature of the internal combustion engine, while maintaining the lift amount of the intake valve, and
    wherein the fuel injection control section controls the fuel injection timing, so that fuel is injected in the period when the intake valve is open.

2. The control apparatus according to claim 1, wherein the variable valve control section controls the variable control mechanism so that the degree of combustion stability is a stability limit value that is fixed beforehand.

3. The control apparatus according to claim 1, wherein the variable valve control section retards the opening and closing timing of the intake valve in angle and advances the opening and closing timing of the exhaust valve in angle when the degree of combustion stability is lower than a stability limit value that is fixed beforehand.

4. The control apparatus according to claim 1, wherein the internal combustion engine is provided with a fuel injection valve that injects fuel into an intake pipe, and
    wherein the fuel injection control section determines, on the basis of the advance angle amount of the fuel injection timing of the fuel injection valve provided in a cylinder, the proportion of fuel injection amounts injected from the fuel injection valve provided in the intake pipe and the fuel injection valve provided in the cylinder.

5. The control apparatus according to claim 1, wherein the control apparatus maintains the degree of combustion stability by using a signal from at least any one of an air-fuel ratio sensor, an in-cylinder pressure sensor and a crank angle sensor provided in the internal combustion engine.

* * * * *